(12) United States Patent
Rogala et al.

(10) Patent No.: US 9,714,718 B2
(45) Date of Patent: Jul. 25, 2017

(54) SENSOR FOR CONNECTION DETECTION AND ACTUATOR INCLUDING SAME

(71) Applicants: Jeff Rogala, Delafield, WI (US); Benjamin N. Shimon, Pewaukee, WI (US); Kenneth Shawn Gagne, Dousman, WI (US)

(72) Inventors: Jeff Rogala, Delafield, WI (US); Benjamin N. Shimon, Pewaukee, WI (US); Kenneth Shawn Gagne, Dousman, WI (US)

(73) Assignee: TLX Technologies, LLC, Pewaukee, WI (US)

( * ) Notice: Subject to any disclaimer, the term of this patent is extended or adjusted under 35 U.S.C. 154(b) by 106 days.

(21) Appl. No.: 14/731,595

(22) Filed: Jun. 5, 2015

(65) Prior Publication Data

US 2016/0356395 A1    Dec. 8, 2016

(51) Int. Cl.

| | |
|---|---|
| *F16K 27/02* | (2006.01) |
| *F16K 37/00* | (2006.01) |
| *F16K 1/30* | (2006.01) |
| *F16K 31/122* | (2006.01) |
| *A62C 37/46* | (2006.01) |
| *F17C 13/04* | (2006.01) |
| *F16K 31/00* | (2006.01) |

(52) U.S. Cl.
CPC ............ *F16K 27/029* (2013.01); *A62C 37/46* (2013.01); *F16K 1/308* (2013.01); *F16K 27/02* (2013.01); *F16K 31/00* (2013.01); *F16K 31/122* (2013.01); *F16K 37/0025* (2013.01); *F16K 37/0041* (2013.01); *F17C 13/04* (2013.01); *Y10T 137/0491* (2015.04); *Y10T 137/5987* (2015.04); *Y10T 137/6011* (2015.04); *Y10T 137/7668* (2015.04); *Y10T 137/8225* (2015.04); *Y10T 137/8242* (2015.04)

(58) Field of Classification Search
CPC ......... Y10T 137/0491; Y10T 137/8242; Y10T 137/8225; Y10T 137/6011; Y10T 137/7668; Y10T 137/5987; F16K 1/308; F16K 27/02; F16K 31/122; F16K 37/0041; F16K 31/10; F16K 27/029; A62C 37/46
See application file for complete search history.

(56) References Cited

U.S. PATENT DOCUMENTS

| | | | | |
|---|---|---|---|---|
| 3,859,485 | A * | 1/1975 | Blinkilde | B60N 2/002 200/85 A |
| 4,137,116 | A * | 1/1979 | Miller | H01H 3/141 156/269 |
| 4,345,236 | A * | 8/1982 | Eichelberger | H01C 10/305 29/610.1 |
| 4,475,402 | A * | 10/1984 | Burkel | G01L 9/0072 73/114.37 |
| 4,920,241 | A * | 4/1990 | Miller | H01H 3/142 200/61.43 |

(Continued)

FOREIGN PATENT DOCUMENTS

WO   WO 2012/070458 A1   5/2012

*Primary Examiner* — Atif Chaudry
(74) *Attorney, Agent, or Firm* — Reinhart Boerner Van Deuren P.C.

(57) ABSTRACT

There is disclosed a mechanism for detecting that a valve coupled to a pressurized container is fully installed into a nose piece of an actuator for actuating the valve.

19 Claims, 17 Drawing Sheets

(56) References Cited

U.S. PATENT DOCUMENTS

| | | | | |
|---|---|---|---|---|
| 5,019,950 A | * | 5/1991 | Johnson | A47G 27/0243 200/85 R |
| 5,132,583 A | * | 7/1992 | Chang | G01B 7/18 252/62.9 R |
| 5,550,755 A | * | 8/1996 | Martin | H01R 13/641 340/815.47 |
| 5,695,859 A | * | 12/1997 | Burgess | H01H 1/029 200/85 R |
| 5,945,929 A | * | 8/1999 | Westra | H01H 13/702 338/114 |
| 9,062,788 B2 | | 6/2015 | Mainland et al. | |
| 2004/0036273 A1 | * | 2/2004 | McClary | H01R 13/641 285/18 |
| 2010/0301245 A1 | | 12/2010 | Accurso et al. | |
| 2011/0120735 A1 | | 5/2011 | Huang | |
| 2013/0032741 A1 | | 2/2013 | Porterfield, Jr. et al. | |
| 2013/0269784 A1 | * | 10/2013 | Dahlgren | F16K 37/00 137/1 |

\* cited by examiner

SENSOR FOR CONNECTION DETECTION AND ACTUATOR INCLUDING SAME

FIELD OF THE INVENTION

This invention generally relates to an actuator configured for coupling to a pressure valve which is in turn coupled to a pressurized container, and more particularly to a sensor for detecting that the pressure valve is fully connected to the actuator.

BACKGROUND OF THE INVENTION

Fire suppression systems used pressurized containers of a fire suppressant material under high pressure. These pressurized containers are installed in a system that includes plumbing from each container to a location associated with the fire detection or fire alarm switch used to initiate delivery of the fire suppressant material from the container through the plumbing to suppress the fire. An actuator is activated to operate a valve coupled to the container to release the suppressant material from the pressurized container to the plumbing that delivers the suppressant material to the fire.

The pressurized containers must be pressure tested at regular intervals, typically annually. The pressurized containers may also have to be replaced after use or damage. Since such systems typically contain many such pressurized containers, each pressurized container must be removed from the system, tested, and assuming that it passes the test, reinstalled into the system. Frequently, one or more pressurized containers is not reinstalled, or not reinstalled properly, which is a major problem that typically goes undetected.

The National Fire Protection Association has passed requirements, effective in 2016, that fire suppression systems having an electric actuator must be "supervised" and provide audible and visual indication of system impairment at the system's releasing control panel.

It is known to use an electrical conductor and alarm externally attached to the pressurized container, valve, and solenoid to detect that the container is installed in the system. Such sensing circuit detects the presence or absence of a container. However, such sensing circuit will not sense if the valve coupled to the container is fully installed with the actuator. In other words, such a sensing system may indicate that the system is ready, although it actually is not because the actuator is not fully installed on the valve. As such, there is a need in the art for a sensor device that may be incorporated into an actuator to allow for a determination that the actuator is fully installed on a valve.

The invention provides such a sensor device, as well as an actuator including the same. These and other advantages of the invention, as well as additional inventive features, will be apparent from the description of the invention provided herein.

BRIEF SUMMARY OF THE INVENTION

In one aspect, a mechanical sensor is provided which is coupled to an actuator. The mechanical sensor is operable to detect when the actuator is fully installed on a valve. An embodiment of such a mechanical sensor includes an actuation disk configured for reciprocal, axial movement within a bore defined in a nose piece of the actuator. The mechanical sensor also includes a location disk configured for reciprocal, axial movement within the bore defined in the nose piece of the actuator. A sensor is axially interposed between the actuation disk and location disk. When the actuator is installed on a valve, a portion of the valve contacts the actuation disk and moves the actuation disk back against the center to indicate that the actuator is fully installed on the valve.

A mechanical sensor may also include an adaptor. The adaptor may be configured for rotational engagement with the nose piece and valve.

The actuation disk and location disk are rotationally fixed relative to one another about a center longitudinal axis of the mechanical sensor by an anti-rotational arrangement.

In one embodiment, the anti-rotational arrangement is formed by a first key and a first key way receiving the first key, as well as a second key and a second key way receiving the second key. The first key is formed on the nose piece. The first key way is formed on the actuation disk. The second key is formed on the actuation disk, and the second key way is formed on the location disk.

In another embodiment, the anti-rotational arrangement is formed by a key and a key way receiving the key, as well as a boss and a termination bore receiving the boss. The key is formed on the actuation disk and the key way is formed on the location disk. The boss is formed on the location disk, and the termination bore is formed on the nose piece.

In another embodiment, the anti-rotational arrangement is formed by a key and a key way receiving the key, as well as a boss and a termination bore receiving the boss. The key is formed on the nose piece and the key way is formed on the actuation disk. The boss is formed on the location disk and the termination bore is formed on the nose piece.

The nose piece also includes a termination bore, and a location disk includes an aperture aligned co-axially with the terminal bore. The sensor includes lead wires which pass through the aperture of the location disk and through the termination bore of the nose piece. The aperture of the location disk and the terminal bore of the nose piece are co-axially aligned along an axis which is parallel to and radially offset from a center longitudinal access of the mechanical sensor.

In certain embodiments, the sensor is a pressure sensitive film device configured to detect a pressure between the actuation disk and a location disk.

In another aspect, an actuator for a valve is provided. The actuator includes an actuator housing. A nose piece is coupled to the actuator housing. A bore is defined in the nose piece. An actuation disk is disposed in the bore of the nose piece. A location disk is disposed in the bore of the nose piece. The actuation disk and location disk are axially movable within the nose piece. A bias member is disposed in the nose piece. The bias member is configured to force the location disk against a sensor which is in turn forced against the actuation disk. The sensor is a pressure sensitive film device configured to detect a pressure between the actuation disk and the location disk.

In another aspect, a mechanical sensor for coupling to an actuator is provided. The mechanical sensor is operable to detect when the actuator is fully installed on a valve. The mechanical sensor includes an actuation disk within a bore defined in a nose piece of the actuator. The mechanical sensor also includes a location disk within the bore defined in the nose of the actuator. A sensor is axially interposed between the actuation disk and the location disk. The actuation disk and location disk are rotationally fixed relative to one another about a center longitudinal axis of the mechanical sensor by an anti-rotational arrangement.

In one embodiment, the anti-rotational arrangement is formed by a first key and a first key way receiving the first key, as well as a second key and a second key way receiving the second key. The first key is formed on the nose piece. The first key way is formed on the actuation disk. The second key is formed on the actuation disk, and the second key way is formed on the location disk.

In another embodiment, the anti-rotational arrangement is formed by a key and a key way receiving the key, as well as a boss and a termination bore receiving the boss. The key is formed on the actuation disk and the key way is formed on the location disk. The boss is formed on the location disk, and the termination bore is formed on the nose piece.

In another embodiment, the anti-rotational arrangement is formed by a key and a key way receiving the key, as well as a boss and a termination bore receiving the boss. The key is formed on the nose piece and the key way is formed on the actuation disk. The boss is formed on the location disk and the termination bore is formed on the nose piece.

The sensor may be a pressure sensitive film device configured to detect a pressure between the actuation disk and the location disk.

When the actuator is installed on a valve, a portion of the valve contacts the actuation disk and moves the actuation disk back against the sensor to indicate that the actuator is fully installed on the valve.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

These and other advantages of the present disclosure are best understood with reference to the drawings, in which.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
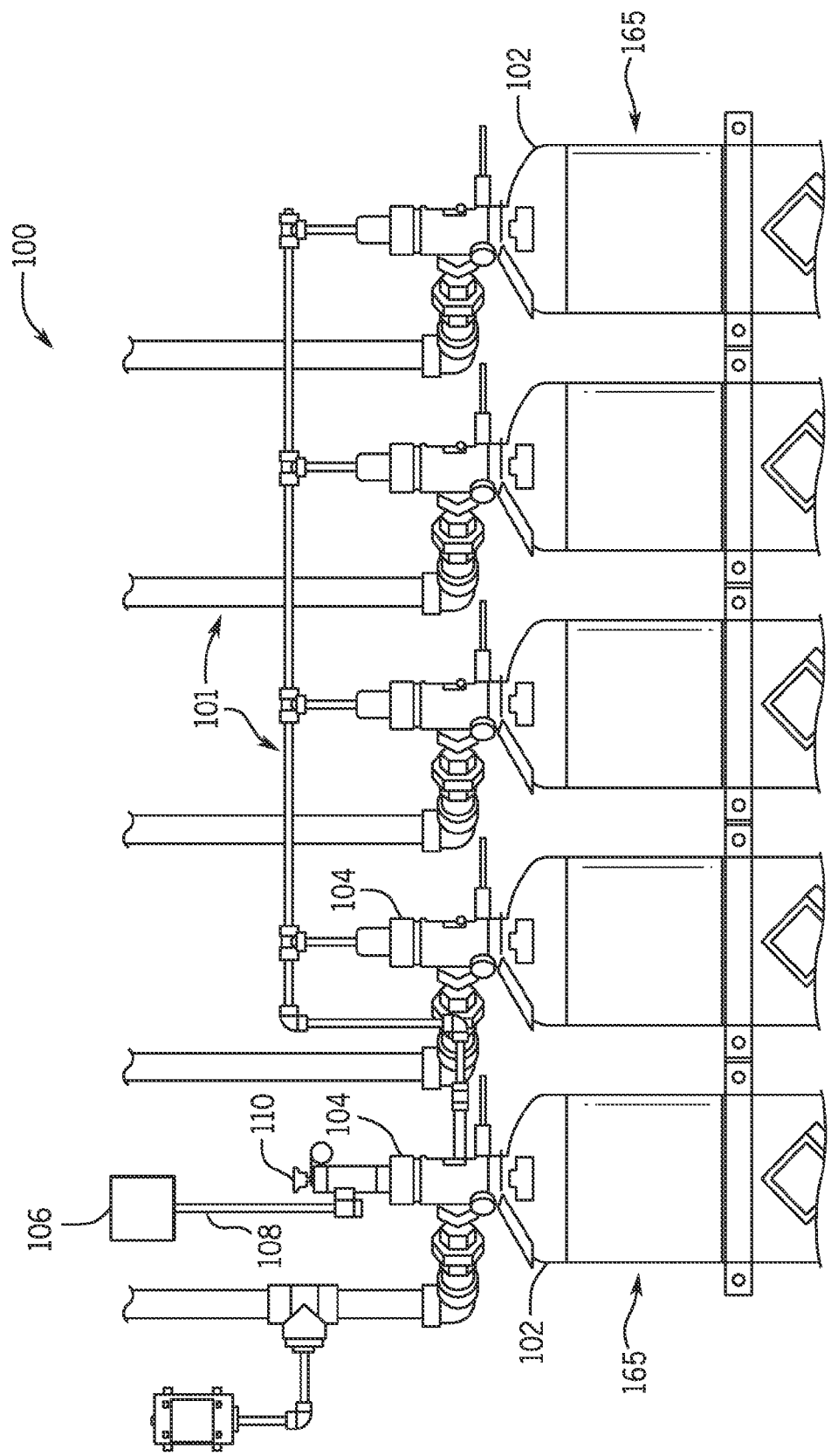
FIG. 1 is a partial perspective view of a fire suppression system, including a plurality of pressurized containers coupled to a plumbing system, with a primary container coupled to a pressure valve and latching solenoid having a mechanical sensor.
Figure 9:
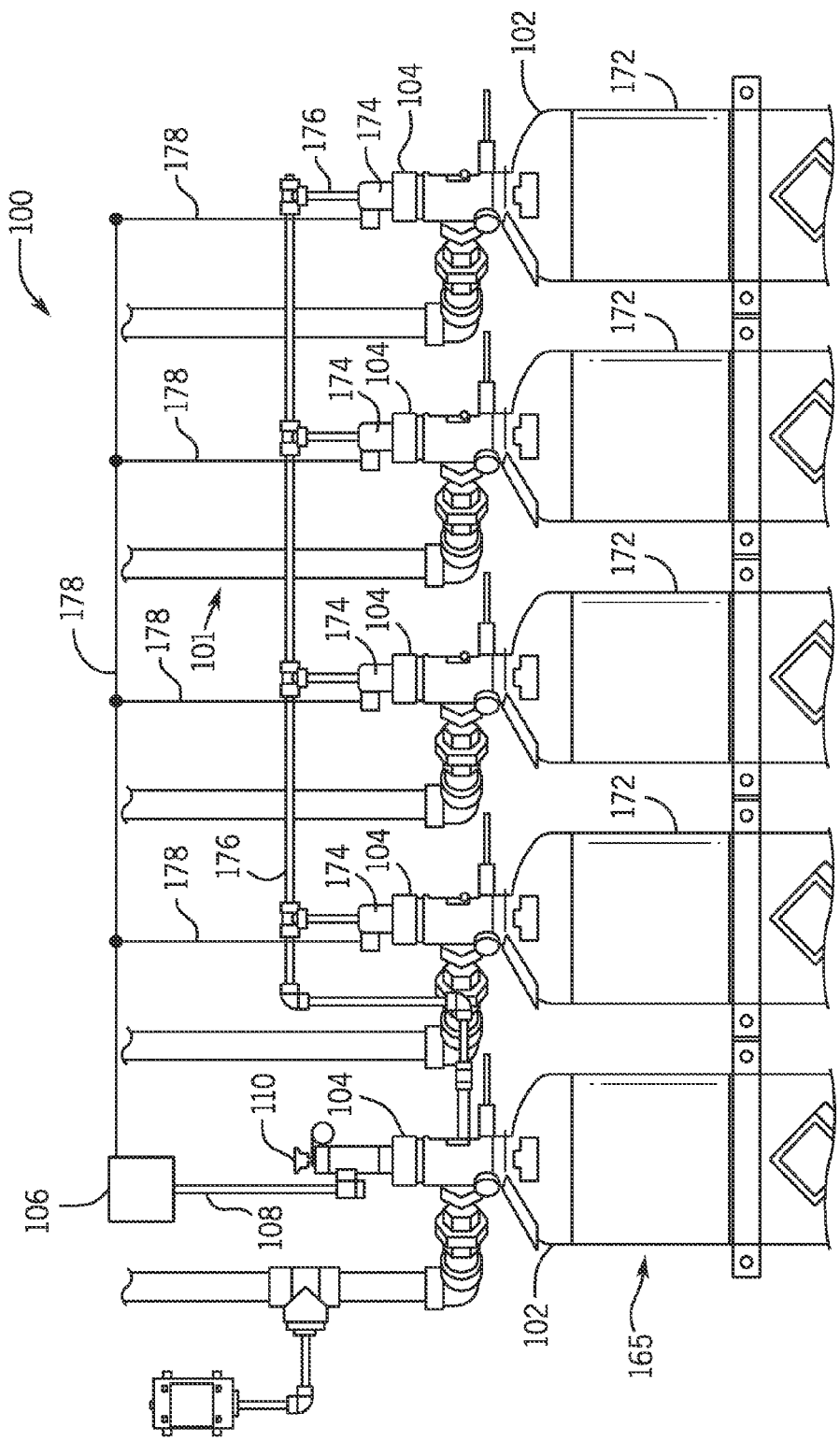
FIG. 9 is a partial perspective view of a fire suppression system including a plurality of pressurized vessels coupled to fire suppression plumbing with a primary vessel coupled to a pressure valve and a latching solenoid having a mechanical sensor and at least one slave vessel coupled to a pressure valve and a pneumatic actuator having a mechanical sensor coupled to a control unit.

Referring to FIGS. 1-10, an exemplary embodiment of a fire suppression system 100 is illustrated in FIG. 1 and another exemplary embodiment is illustrated in FIG. 9.

Referring first to FIGS. 1-8, an exemplary embodiment of a fire suppression system 100 is illustrated in FIG. 1. A plurality of pressurized cylinders 102 are coupled to plumbing 101 consisting of a variety of tubes and pipes of various sizes. The plumbing 101 is installed, for example in a building, at various locations within the building. The pressurized cylinders 102 contain, typically a fire suppression fluid 164, with the system configured to deliver the fire suppression fluid 164, from the pressure cylinders 102 through the plumbing 101, to a location associated with the fire detection or fire alarm switch. The delivery of the fire suppression fluid 164 is initiated, typically by a latching solenoid 110 which activates a pressure valve 104 coupled to each of the pressure cylinders 102. The solenoid 110 operates to move the pressure valve to release the fire suppression fluid 164 from the pressurized cylinder 102 to deliver the suppressive material to a fire.

Because the pressure cylinders 102 have to be replaced after use, or replaced because of damage or expiration of useful life, mechanisms have been used to determine whether or not the pressure cylinders are installed in the fire suppression system 100. A typical method is to use electrical conductivity to determine if the pressure cylinders are installed in the system. Although electrical continuity systems will indicate if the pressure cylinder is installed, such system does not typically indicate if the pressure cylinder is properly installed for operation. For example, if the pressure cylinder and pressure valve are not fully seated in a coupling with the latching solenoid 110, or pneumatic actuator 174 system 100 will not be in a condition to operate the appropriate pressure valve to release the fire suppression fluid from the pressure cylinder.

This disclosure provides a mechanical sensor 114 coupled to one of a latching solenoid 110 and pneumatic actuator 174 that will provide an indication that a pressure cylinder 165 or 172 and pressure valve 104 are properly coupled in a fire suppression system 100. The solenoid 110 and pneumatic actuator 174 are coupled to a controlled unit 106 through control wiring 108 and 178. The control unit 106 (also referred to as a controller) and control wiring 108 and 178 provide electrical power to the latching solenoid 110, pneumatic actuator 174, and signal data from the mechanical sensor 114.

Figure 2:
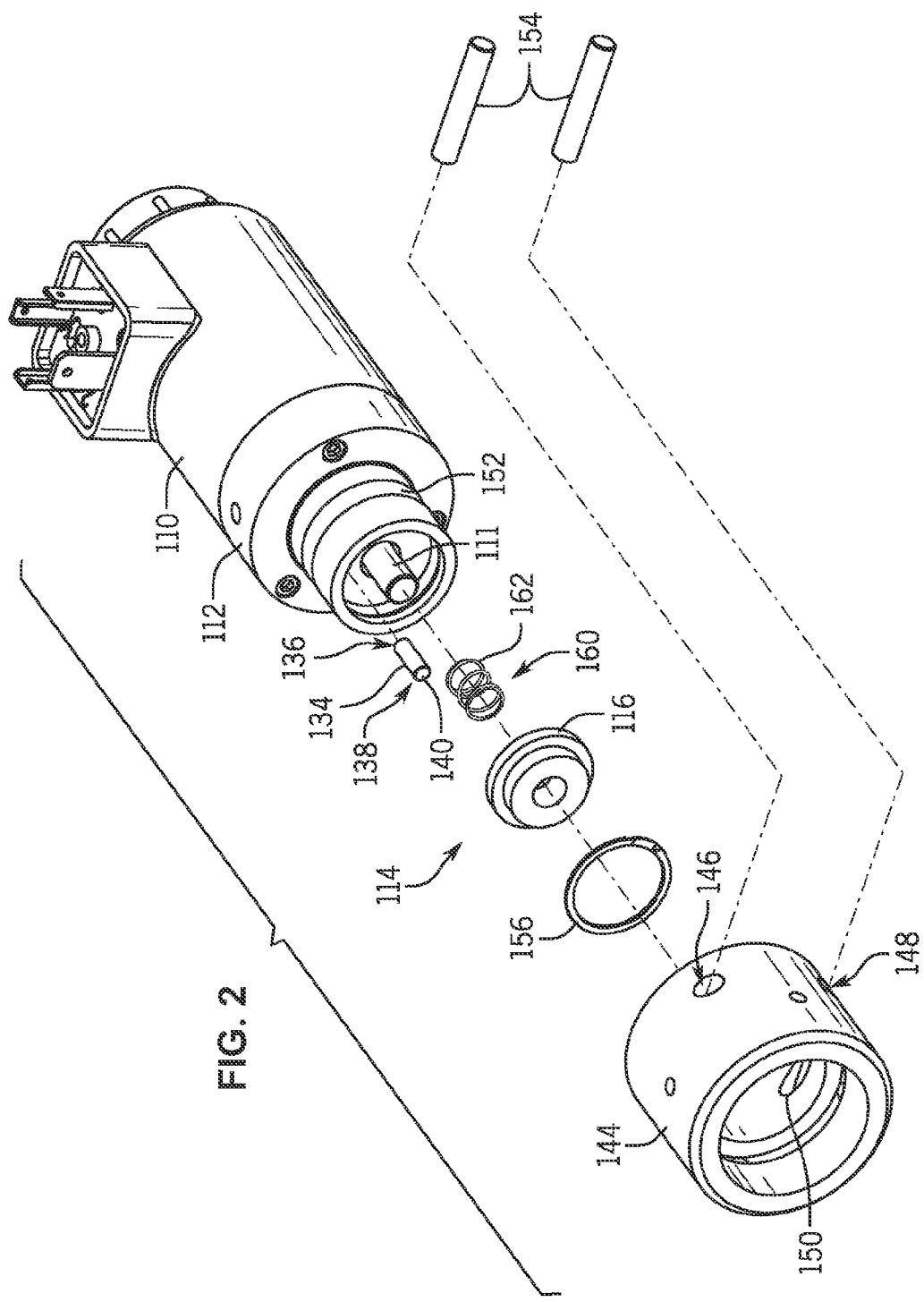
FIG. 2 is an exploded, perspective view of an exemplary embodiment of a mechanical sensor, adaptor, and latching solenoid.

As illustrated in FIG. 2, a latching solenoid 110 includes a nose piece 112. The nose piece 112 defines a first bore 118. The first bore defines a first portion 120, a second portion 122, and a third portion 124. Each of the portions is defined by a different inner diameter D1, D2, and D3 respectively. (See FIG. 3) The first bore 118 extends through the full length of the nose piece 112. A solenoid pin 111 is disposed within the third portion 124 of the first bore 118 and has a diameter of approximately the same inside dimension as the third portion 124 of the first bore 118. The solenoid pin 111 is moved by the solenoid mechanism when the latching solenoid 110 is activated. The solenoid pin 111 is pushed to engage the pressure valve 114 to release the fire suppression fluid 164 from the vessel 165.

Figure 3:
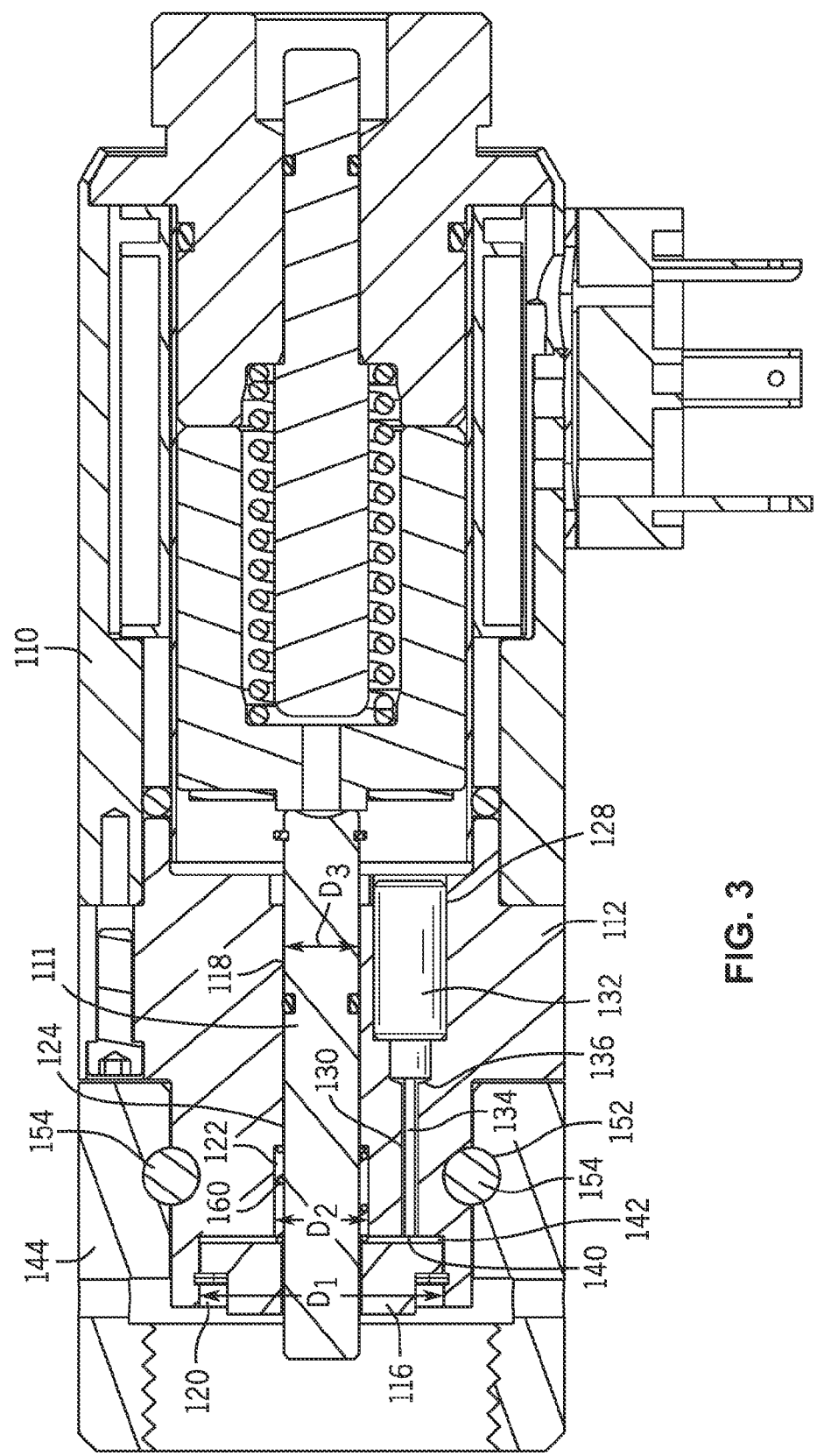
FIG. 3 is a section plan view of the mechanical sensor, adaptor, and latching solenoid illustrated in FIG. 2 assembled.
Figure 4:
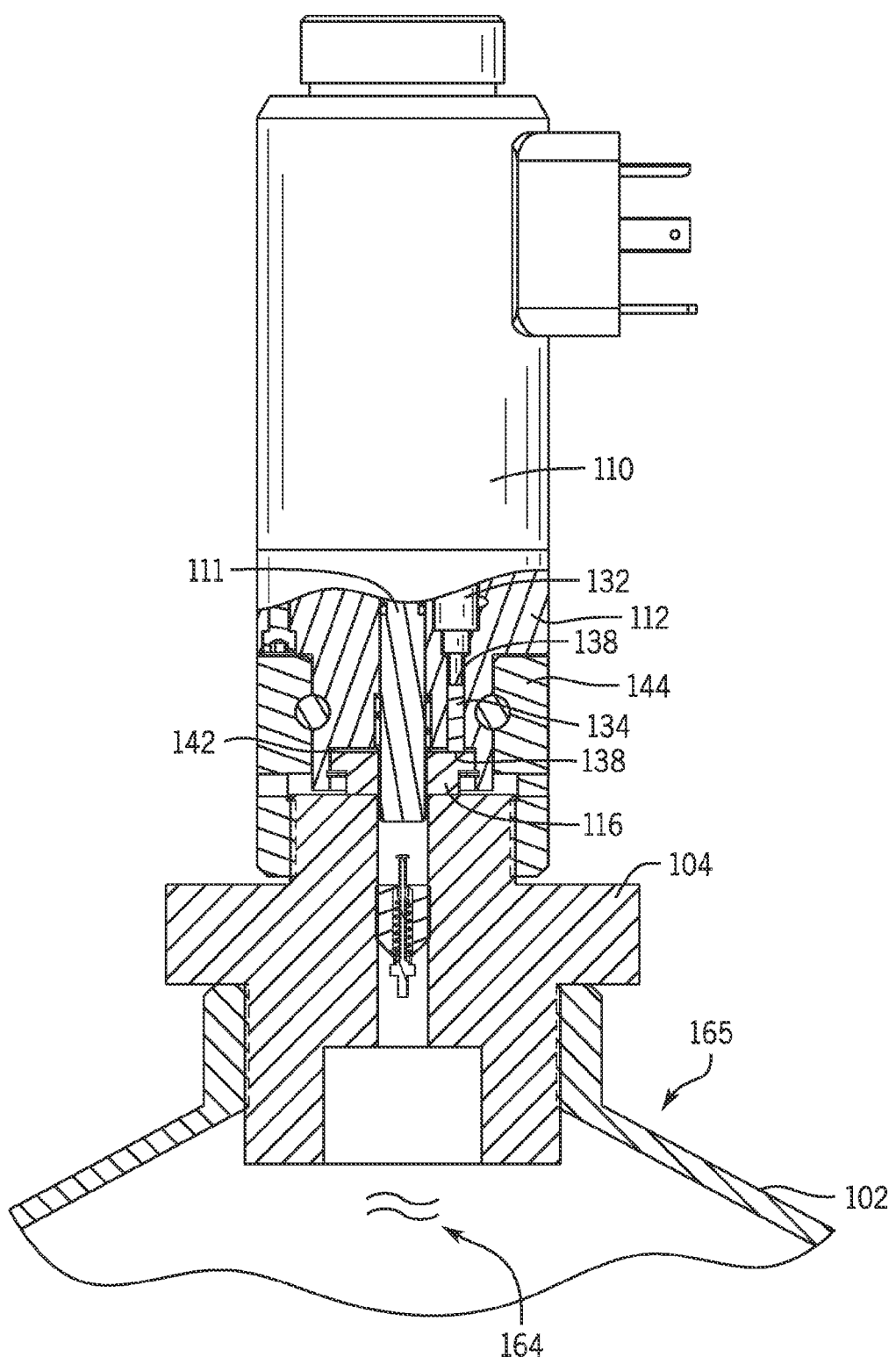
FIG. 4 is a partial plan view of a mechanical sensor, adaptor, and latching solenoid coupled to a pressurized vessel with the solenoid not fully, properly engaged with the pressurized vessel.
Figure 5:
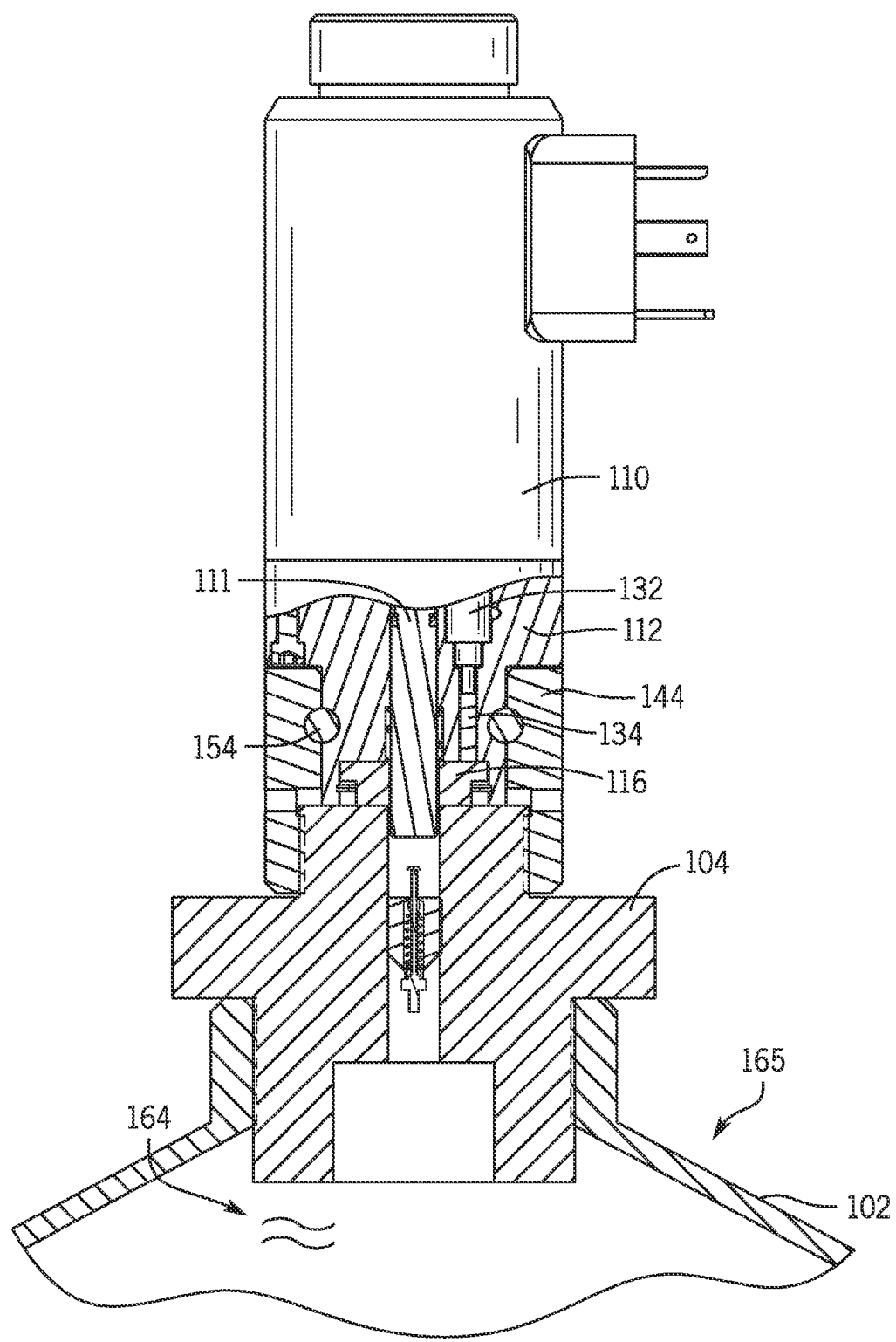
FIG. 5 is a partial plan view of a mechanical sensor, adaptor, and latching solenoid coupled to a pressurized vessel with the solenoid fully, properly engaged with the pressurized vessel.
Figure 6:
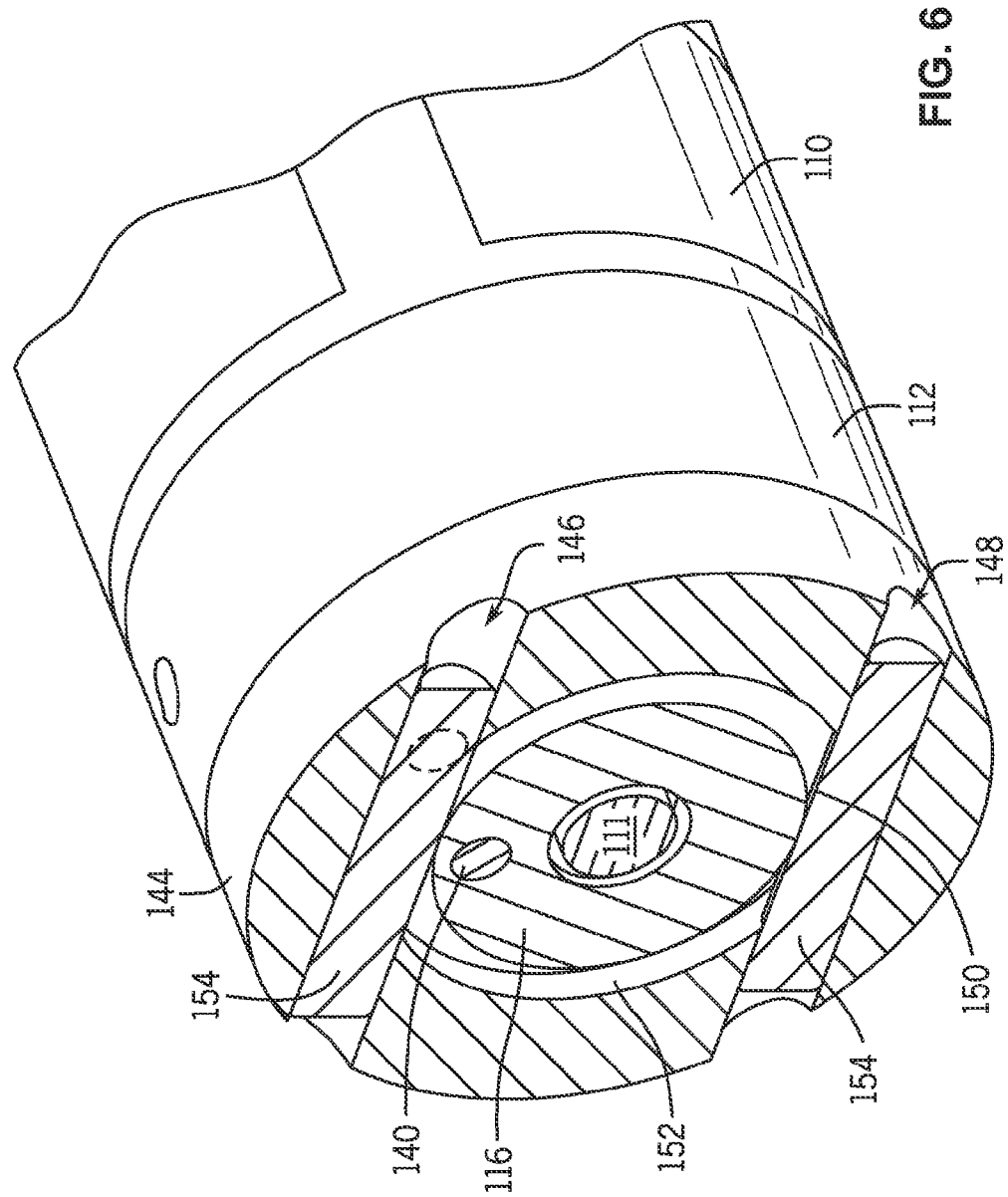
FIG. 6 is a partial, perspective view of the adaptor illustrated in FIG. 3 coupled to the solenoid with two dowels, with the adaptor configured for rotational engagement with a nose piece of the solenoid and the pressure valve.

The mechanical sensor 114 includes a disk 116 which is configured to fit within the first portion 120 of the first bore 118 defined in the nose piece 112. The disk 116 typically is round in shape and may have a step profile as illustrated in FIGS. 2 and 3. The disk 116 can be composed of any convenient material, for example, metal, engineered plastic, composite material or any combination of such material suitable for the application. The disk 116 is further configured for reciprocal, axial movement within the first portion 120 of the first bore 118. The disk 116 defines a central hole through which the solenoid pin 111 extends. The disk 116 is retained within the nose piece 112 by a retainer member 156. The retainer member 156 can be for example a snap-ring as illustrated in FIG. 2. The retainer member 156 prevents the disk 116 from moving out of the nose piece 112 and away from the latching solenoid 110.

A biasing member 160, for example a compression spring 162, is fitted within the second portion 122 of the first bore 118. The biasing member 160 forces the disk 116 away from a back wall defined in the nose piece 112 by the first portion 120 of the first bore 118. The pre-determined axial distance 142 resulting from the bias force of the bias member 160 prevents the disk 116 from initially contacting a switch push pin 134 described below.

The back surface (herein defined as the surface facing the solenoid 110) of the disk 116 can define an annular groove configured for engagement with the switch push pin 134. In a preferred embodiment, the surface of the disk 116 that contacts the switch push pin 134 is planer along its entire surface.

In another embodiment a pressure sensitive film 168 device, for example a flexible membrane potentiometer having a lower power requirement and a linear output, is disposed between the back surface 117 of the disk 116 and back wall 121 of the first portion 120 of the first bore 118. In this embodiment there is no electrical switch or switch push pin in second bore 128. Sensor wires 170 coupled to the pressure switch film 168 and the control unit 106 pass through the second bore 128. When the pressure valve 104 is properly coupled to the latching solenoid 110, the pressure valve 104 pushes the disk 116 back against back wall 121 of the bore squeezing the pressure sensitive film 168 and generating a signal through the sensor wires 170 to the control unit 106, indicating proper engagement of the pressure valve 104 with the latching solenoid 110.

The nose piece 112 also defines a second bore 128. An electrical switch 132 is disposed in the second bore 128 of the nose piece 112. The electrical switch 132 is coupled to the control unit through control wiring 108 and an electrical connector associated with the latching solenoid 110. The electric switch can be one of a normally open switch and a normally closed switch.

A portion 130 of the second bore 128 is configured to receive the switch push pin 134. The switch push pin 134 is in physical contact at one end 136 with the electrical switch 132 and with a second end 138 extending into the first portion 120 of the first bore 118. (See FIGS. 4 and 5) The second end of the switch push pin 134 is configured with one of a dome, a foot 140, and a cone. A base of the dome and cone will have the same diameter as the switch push pin 134. The switch push pin 134 can be composed of any convenient material, for example, metal, engineered plastic, composite material, or any combination of such material suitable for the application. The switch push pin 134 is cylindrical in shape and configured to move in the portion 130 of the second bore 128.

When the pressure valve 104 is properly coupled to the latching solenoid 110 the pressure valve 104 contacts the disk 116 and moves the disk back against the switch push pin 134. The switch push pin 134 moves against the switch 132 to change the status of the electrical switch 132 to indicate that the pressure valve 104 is properly coupled to the latching solenoid 110. It should be understood that when reference is made to the pressure valve, it includes not only the operative valve pin but also the valve housing. Typically it is the valve housing that is coupled to the latching solenoid 110 through an adapter 144 which will be described below.

The mechanical sensor 114 is configured such that the disk 116 is maintained in a floating position in the first portion 120 of the first bore 118 in the nose piece 112. The disk 116 is maintained in a coupled position by the bias member 160. When the latching solenoid 110 is coupled to the pressure valve housing 104, a male connector segment of the pressure valve housing pushes against the disk 116 and moves the disk 116 back the predetermined axial distance 142 thereby pushing the switch push pin 134 back against the electrical switch 132 thereby changing the status of the electrical switch. Such status change of the switch 132 generates a signal (ON or OFF) to the control unit 106 to indicate that the pressure value 104 and its associated pressure cylinder 102 is properly fully engaged with the latching solenoid 110. Movement of the disk 116 the predetermined axial distance 142 is calibrated to indicate that at least 90% of the male connector segment of the pressure valve 104 is inserted in the adapter 144 which couples the latching solenoid 110 to the pressure valve 104.

The adapter 144 defines a threaded female portion which is configured to engage the male portion of the pressure valve 104. As described above, the threading of the adapter 144, which is coupled to the nose piece 112 of the latching solenoid 110, must extend at least 90% of the distance into the female portion of the adapter 144 in order for the pressure valve 104 to contact and move the disk 116 back against the switch push pin 134.

The adapter 144 is coupled to the nose piece 112 in such a manner that the adapter 144 can rotate completely around the nose piece 112 as the adapter 144 threadingly engages the pressure valve 104. The nose piece 112 defines an annular groove 152. The adapter 144 also defines two traverse throughbores 146, 148 with each throughbore configured to intersect a portion 150 of the axial bore defined in the adapter with the two throughbores 146, 148 aligned with the annular groove 152 defined in the nose piece 112. (See FIGS. 3 and 5) A dowel 154 is disposed in each through bore 146, 148 when the nose piece 112 is inserted into the adapter 144. Each dowel 154 engages the annular groove 152 securing the adapter 144 to the nose piece 112 but allowing the adapter 144 to rotate about the nose piece 112.

Figure 10:
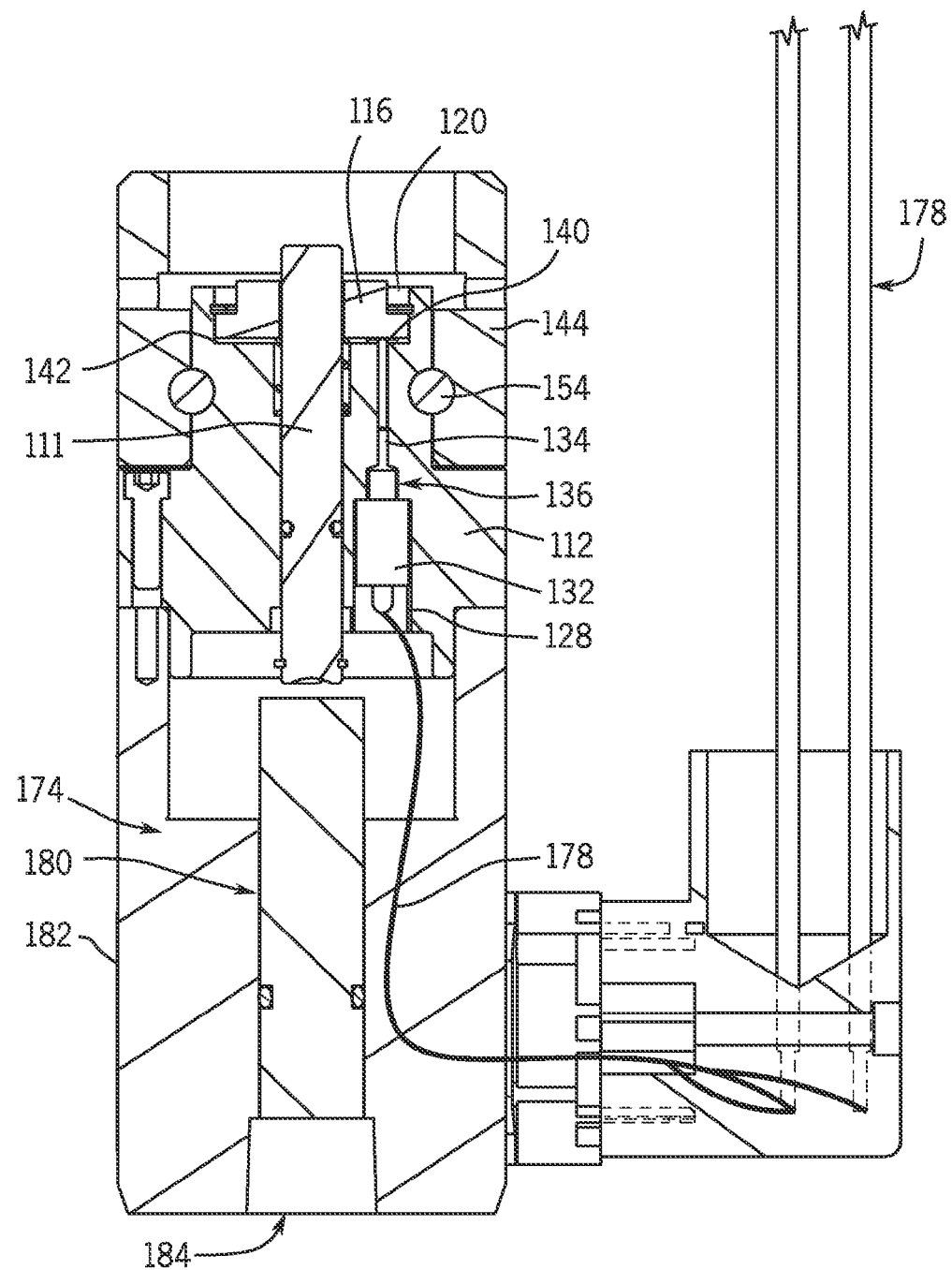
FIG. 10 is a section plan view of the pneumatic actuator illustrated in FIG. 9.

In another embodiment, an actuator coupled to each slave vessel 172 of a fire suppression system 100 is a pneumatic actuator 174 (see FIGS. 9 and 10). In the system 100 illustrated in FIG. 9, the latching solenoid 110 is coupled to a primary vessel 165 and configured to initiate operation of the system 100 as described above in U.S. patent application Ser. No. 13/301,277 which is incorporated by reference herein in its entirety. The pneumatic actuator 174 is coupled to a pressure valve 104 coupled to each slave vessel 172 in the system 100. It should be understood that as many as fifteen slave vessels can be in the system 100.

The latching solenoid 110, upon activation, initiates operation of the pneumatic actuator 174 which is coupled to an appropriate air supply through pneumatic plumbing 176. The pneumatic plumbing 176 is coupled to a pneumatic actuator housing 182 which defines a pneumatic port 184 (see FIG. 10). Pressurized air pushes a pneumatic piston 180 disposed in the pneumatic actuator housing 182 against a solenoid pin 111 to activate the pressure valve 104 coupled to the slave vessel 172.

Figure 7:
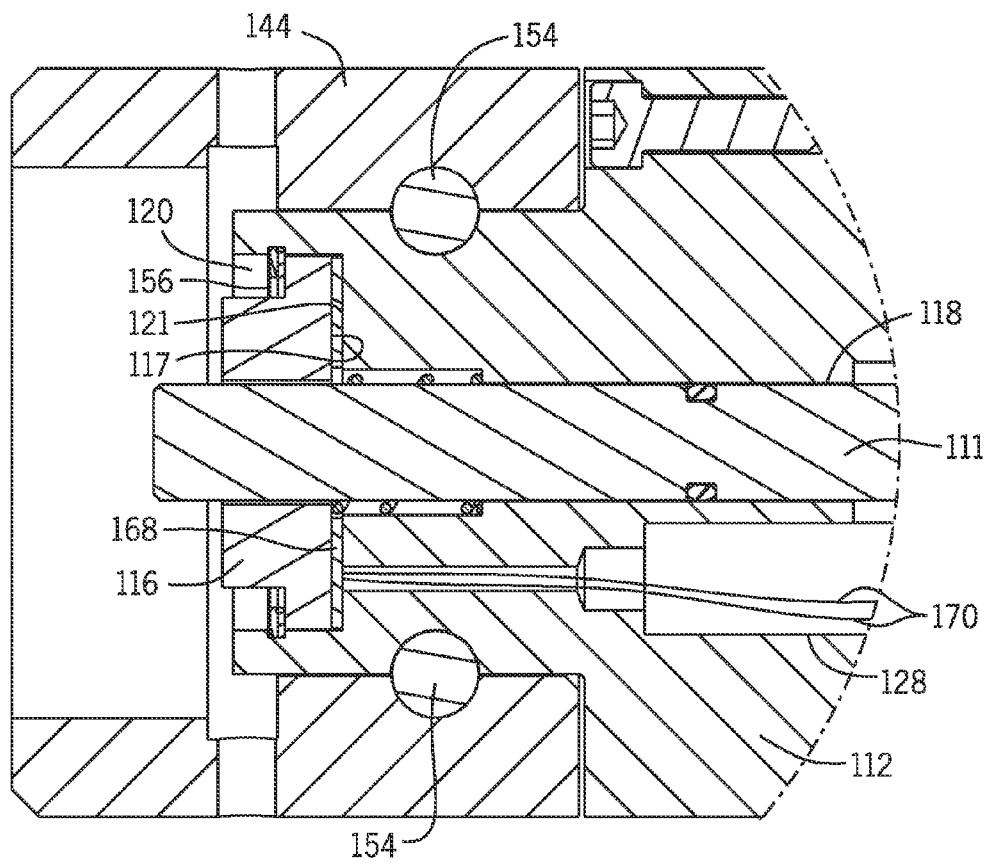
FIG. 7 is a partial, cross-section view of the mechanical sensor illustrated in FIG. 3 with a pressure sensitive film coupled to the disk and without an electric switch and switch push pin in the second bore.
Figure 8:
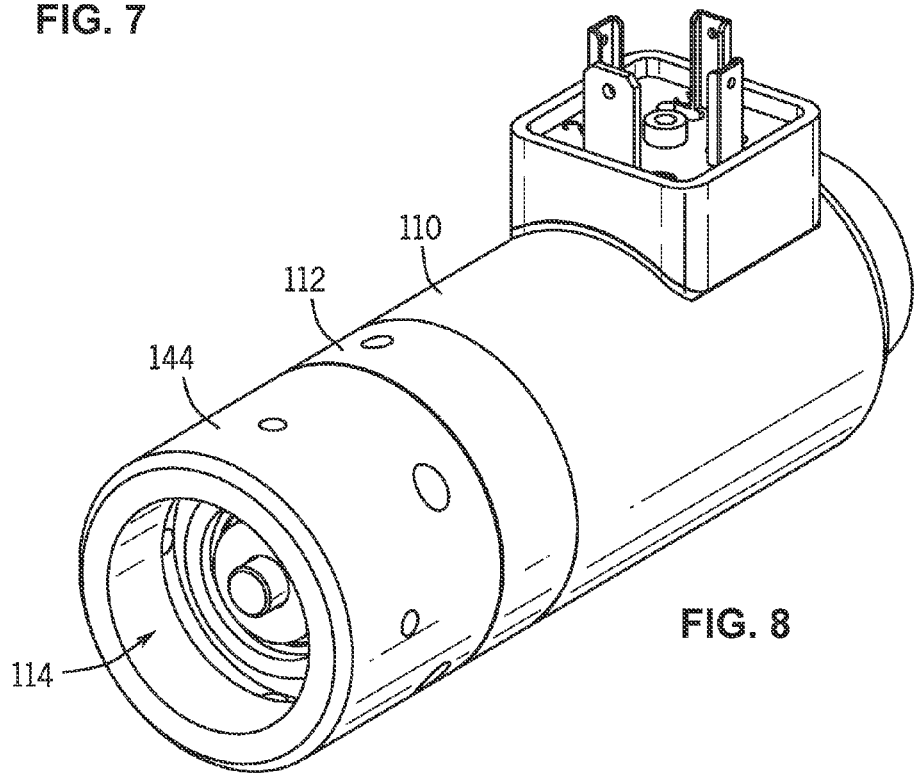
FIG. 8 is a perspective view of the assembled latching solenoid illustrated in FIG. 2, including the mechanical sensor.

It should be understood that the components of the pneumatic actuator 174, other than the pneumatic actuator housing 182, pneumatic piston 180, and pneumatic port 184, are the same as the components described and illustrated at least in FIGS. 2, 3, and 7 and described in the accompanying text. The nose piece 112, mechanical sensor 114 and its elements (116, 156, 160), and the adaptor 144 are coupled to the pneumatic housing 182 of the pneumatic actuator 174. The sensing of proper installation of the pressure valve 104 to the pneumatic actuator 174 is accomplished as described above relative to the latching solenoid 110.

Turning now to FIGS. 11-18, the same illustrate another embodiment of a mechanical sensor which incorporates an anti-rotational arrangement according to the teachings of the present invention. This mechanical sensor may also be incorporated on a latching solenoid or a pneumatic actuator as described above. The following describes the structural attributes of several embodiments of this sensor.

Figure 11:
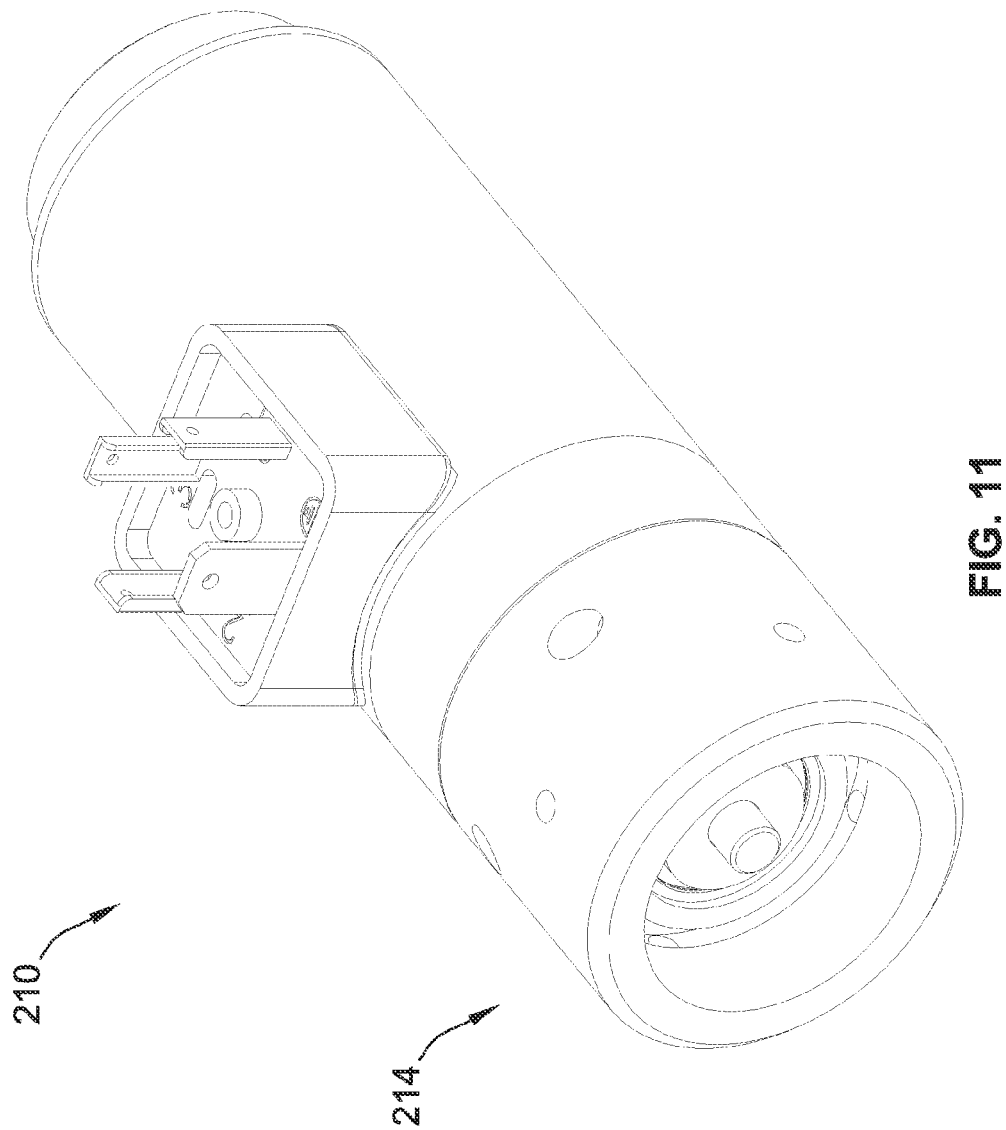
FIG. 11 is another embodiment of an actuator incorporating a mechanical sensor.
Figure 12:
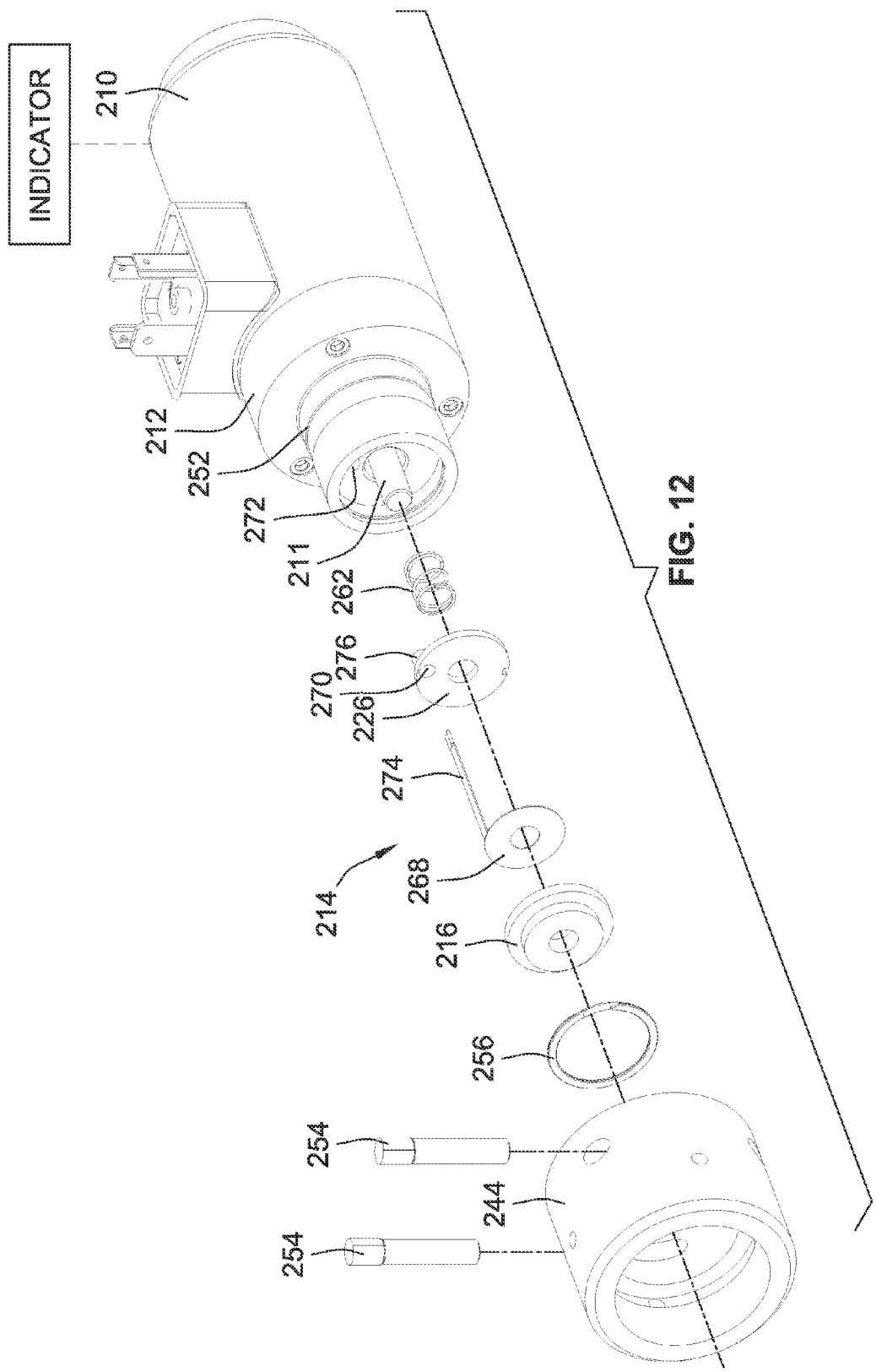
FIG. 12 is an exploded perspective view of the actuator and mechanical sensor.

More specifically, FIG. 11 is a generic perspective representation of an actuator 210 (which may be a latching solenoid or a pneumatic actuator) with a mechanical sensor 214 attached thereto. FIG. 12 is a perspective exploded view of the configuration of FIG. 11, showing various internal components of the mechanical sensor 214. FIGS. 13 and 14A-14C illustrate the mechanical sensor 214, with the mechanical sensor 214 employing one embodiment of an anti-rotational arrangement. FIGS. 15 and 16A-16C illustrate the mechanical sensor 214, with the mechanical sensor 214 employing another embodiment of an anti-rotational arrangement. FIGS. 17 and 18A-18C illustrate the mechanical sensor 214, with the mechanical sensor 214 employing yet another embodiment of an anti-rotational arrangement. As will be understood in greater detail by the following, the aforementioned anti-rotational arrangement advantageously rotationally fixes a sensor between two discs so as to avoid damage to the sensor during installation and operation.

Turning now to FIG. 12, the aforementioned mechanical sensor 214 is shown in greater detail. It will be recognized from inspection of FIG. 12 that many of the components shown therein are the same as that described above relative to FIGS. 1-10. As such, a redundant description will not be provided for purposes of brevity. As will be understood from the following, mechanical sensor 214 incorporates a pressure sensitive film device 268 similar to the pressure sensitive film device 168 described above. This sensor 268 is positioned between an actuation disk 216 and a location disk 226, each of which has a bore for passage therethrough of solenoid pin 211. A compression spring 262 is also provided to force actuation disk 216, location disk 226, and sensor 268 away from a back wall of nose piece 212 in the same manner as that described above relative to compression spring 162. Retaining ring 256 is also provided within an adaptor 244 which is of the same construction as that of adaptor 144 described above. This retaining ring 256 retains actuation disk 216, sensor 268, and location disk 226 within the internal area defined between adaptor 144 and nose piece 212 as shown in the cross-sections of FIGS. 13, 15, and 17. A pair of dowel pins 254 are slidably received within adaptor 244 and cooperate with a groove 252 formed on nose piece 212 to allow adaptor 244 to rotate relative to nose piece 212, while remaining axially retained thereon.

However, an anti-rotational arrangement is formed between the actuation disk 216, location disk 226, and/or nose piece 212 to prevent rotation of actuation disk 216, location disk 226, and sensor 268. Such an arrangement advantageously reduces or eliminates undesirable strain on lead wires 274 of sensor 268 as they pass through an aperture 270 formed in location disk 226 and a bore 272 formed in nose piece 212. Put differently, given this routing of lead wires 274, if sensor 268 were allowed to rotate about a center axis passing through solenoid pin 211, the lead wires 274 could be rotationally sheared away from sensor 268. This is of particular concern given that adaptor 244 includes internal threads for rotationally engaging a valve as described above.

Figure 13:
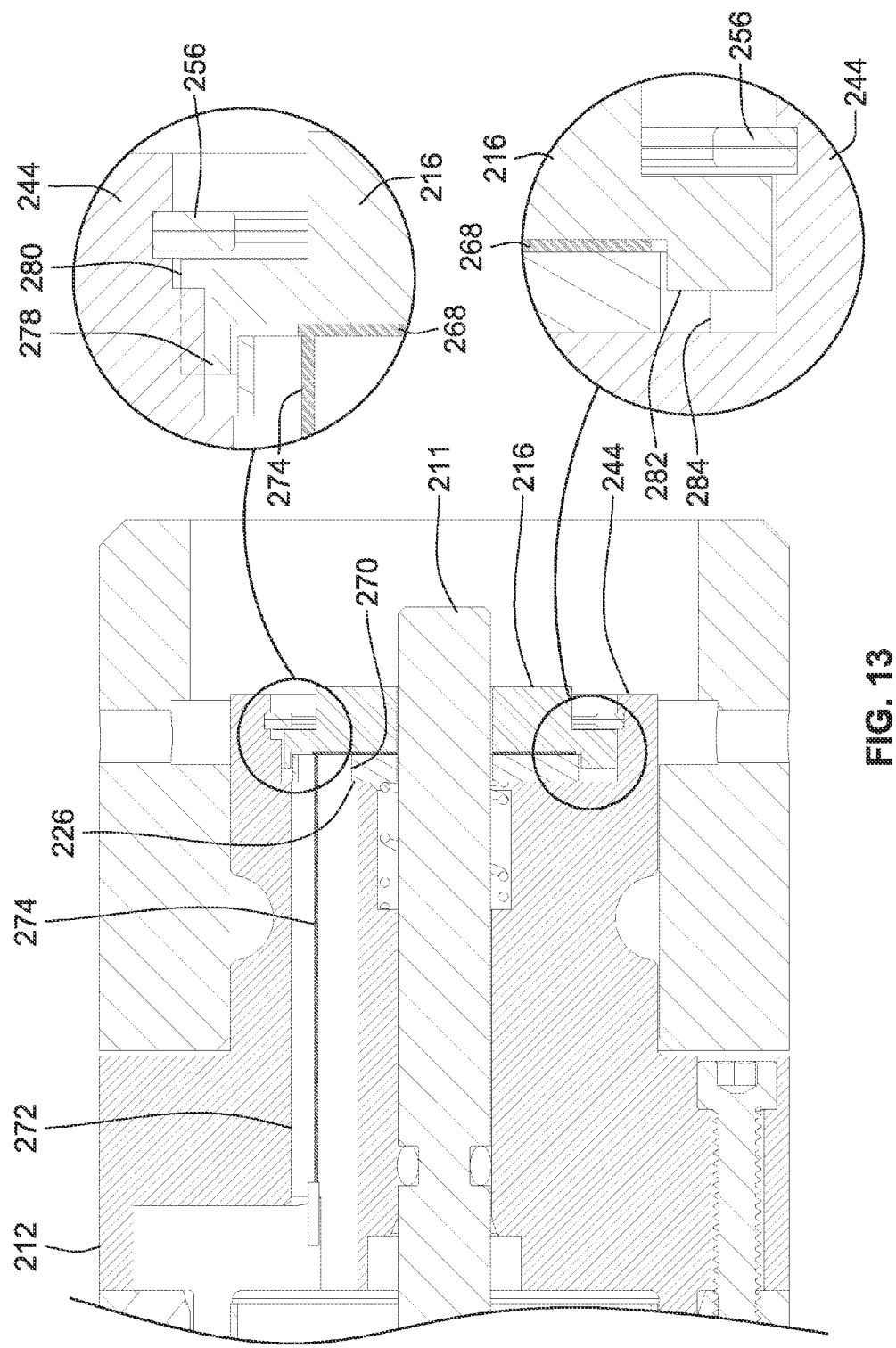
FIG. 13 is a cross section of the mechanical sensor shown in FIG. 11, illustrating one embodiment of an anti-rotational arrangement of the mechanical sensor.

Turning now to FIG. 13, a cross-section of mechanical sensor 214 is illustrated showing one embodiment of the aforementioned anti-rotational arrangement. As can be seen therein, sensor 268 is positioned between actuation disk 216 and location disk 226. Lead wires 274 are routed through aperture 270 and termination bore 272 for subsequent electrical connection as described above. A key 278 axially extends from an interior wall of nose piece 212 as shown. This key 278 is received within a key way 280 formed in actuation disk 216. Such an arrangement prevents the rotation of actuation disk 216 relative to nose piece 212 about a longitudinal axis passing through a center of solenoid pin 211. Actuation disk 216 also includes a key 282 extending axially therefrom which is received in a key way 284 of location disk 226 as shown. Such an arrangement rotationally fixes location disk 226 relative to actuation disk 216. Given that actuation disk 216 is also rotationally fixed relative to nose piece 212, this arrangement not only rotationally fixes actuation disk 216 relative to location disk 226, but rotationally fixes both of these elements relative to nose piece 212.

As such, neither of actuation disk 216 or location disk 226 is capable of exerting a torque against sensor 268 to rotationally displace the same about the longitudinal axis passing through the center of solenoid pin 211.

Figure 14A:
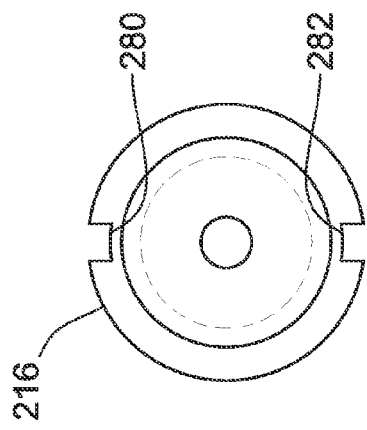
FIGS. 14A-14C illustrate various keys and keyways of the anti-rotational arrangement shown in FIG. 13.
Figure 14B:
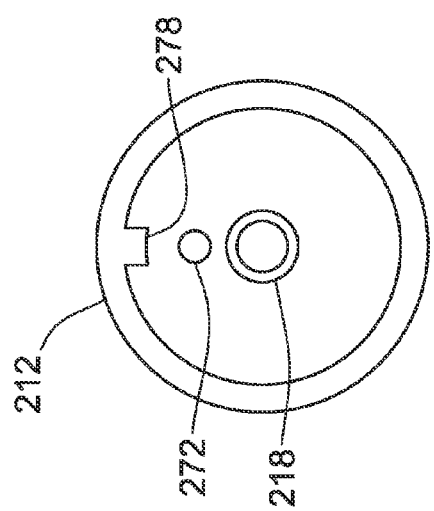
Figure 14C:
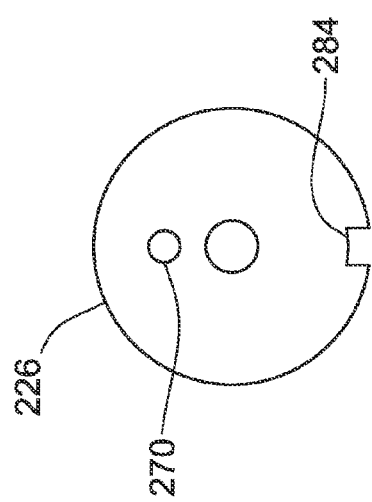

Turning now to FIGS. 14A-14C, the aforementioned keys and key ways are shown in greater detail. With reference first to FIG. 14A, the same illustrates the aforementioned key 278 which projects radially inward as shown. This key 278 is received within a key way 280 formed on actuation disk 216 as shown in FIG. 14B. Actuation disk 216 also includes a key 282 which projects radially inward and is received by key way 284 of locating disk 226 shown in FIG. 14C.

Figure 15:
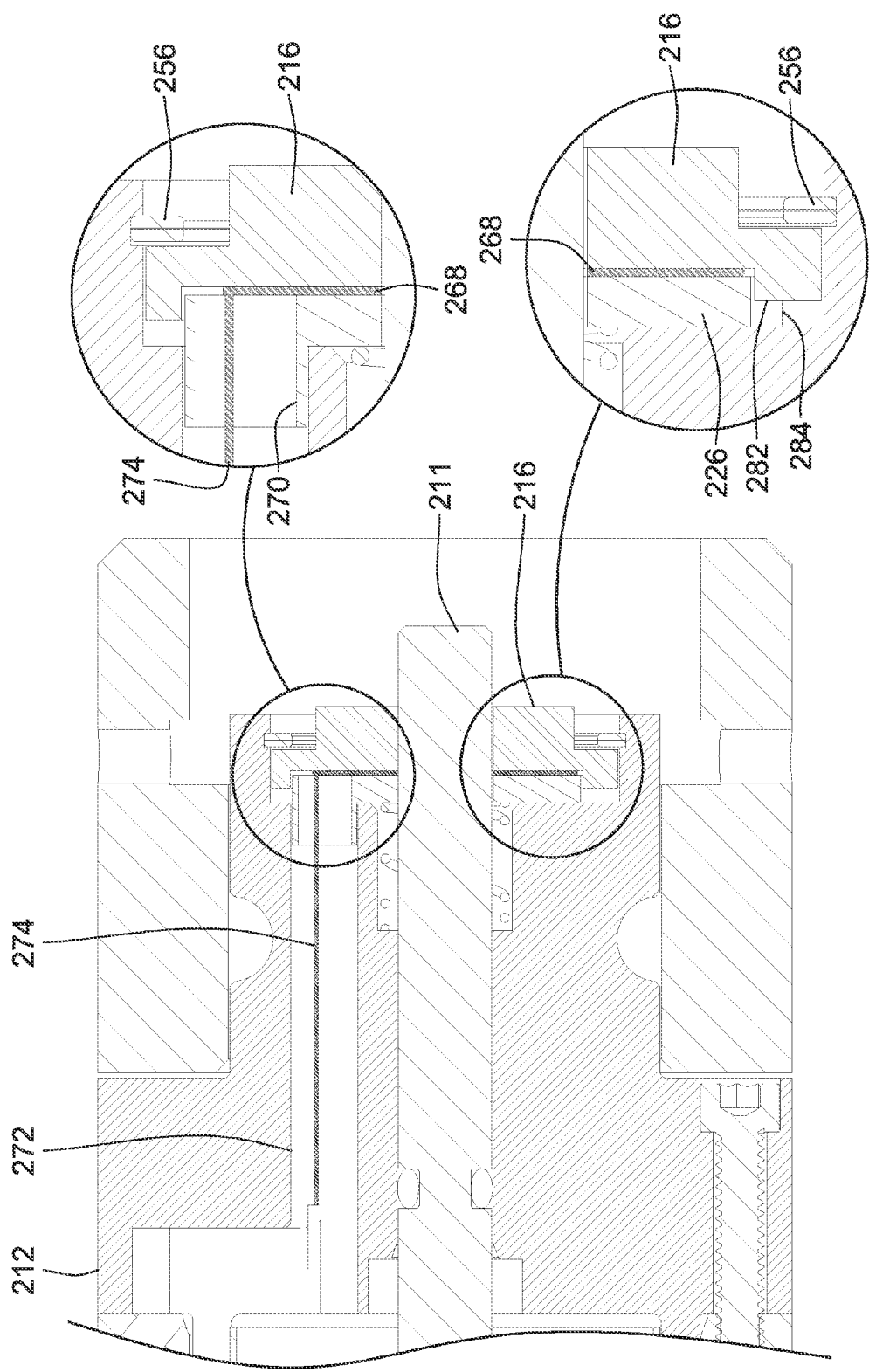
FIG. 15 is a cross section of the mechanical sensor shown in FIG. 11, illustrating another embodiment of an anti-rotational arrangement of the mechanical sensor.

Turning now to FIG. 15, the same illustrates another embodiment of an anti-rotational arrangement. In this embodiment, lead wires 274 pass through aperture 270 formed in location disk 226 and thereafter into termination bore 272 as shown. A key 282 is formed on actuation disk 216, and a corresponding key way 284 is provided on location disk 226. As a result, actuation disk 216 is rotationally fixed relative to location disk 226. A boss 276 which surrounds aperture 274 extends from location disk 226 in this embodiment. This boss 276 is received within termination bore 272 as shown. As a result, location disk 226 is rotationally fixed relative to nose piece 212. As a corresponding result, actuation disk 216 is also rotationally fixed relative to nose piece 212.

Figure 16A:
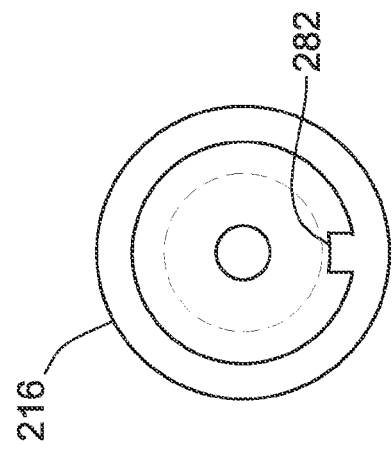
FIGS. 16A-16C illustrate various keys and keyways of the anti-rotational arrangement shown in FIG. 15.
Figure 16B:
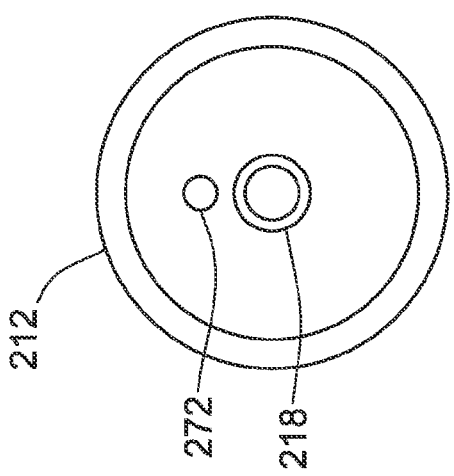
Figure 16C:
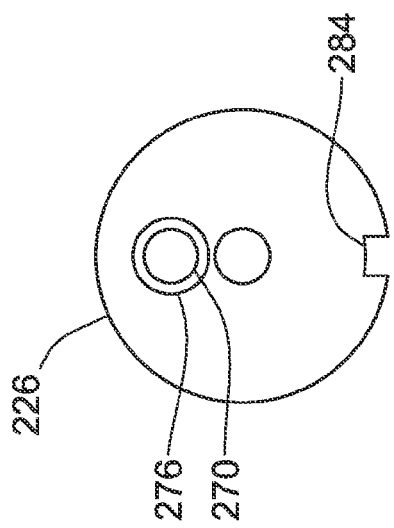

Turning now to FIG. 16A-16C, the aforementioned anti-rotational arrangement illustrated in FIG. 15 is shown in greater detail. Turning first to 16A, nose piece 212 is free of any keys or key ways. However, actuation disk 216 includes a radially inwardly projecting key 282 as shown in 16B. This key 282 is received within a key way 284 of location disk 226. Such an arrangement rotationally fixes location disk 226 relative to actuation disk 216. As can also be seen in FIG. 16C, boss 276 is off center from the center of location disk 226 so that its reception within off center termination bore 272 (See FIG. 16A) prevents rotation of location disk 226 relative to nose piece 212.

Figure 17:
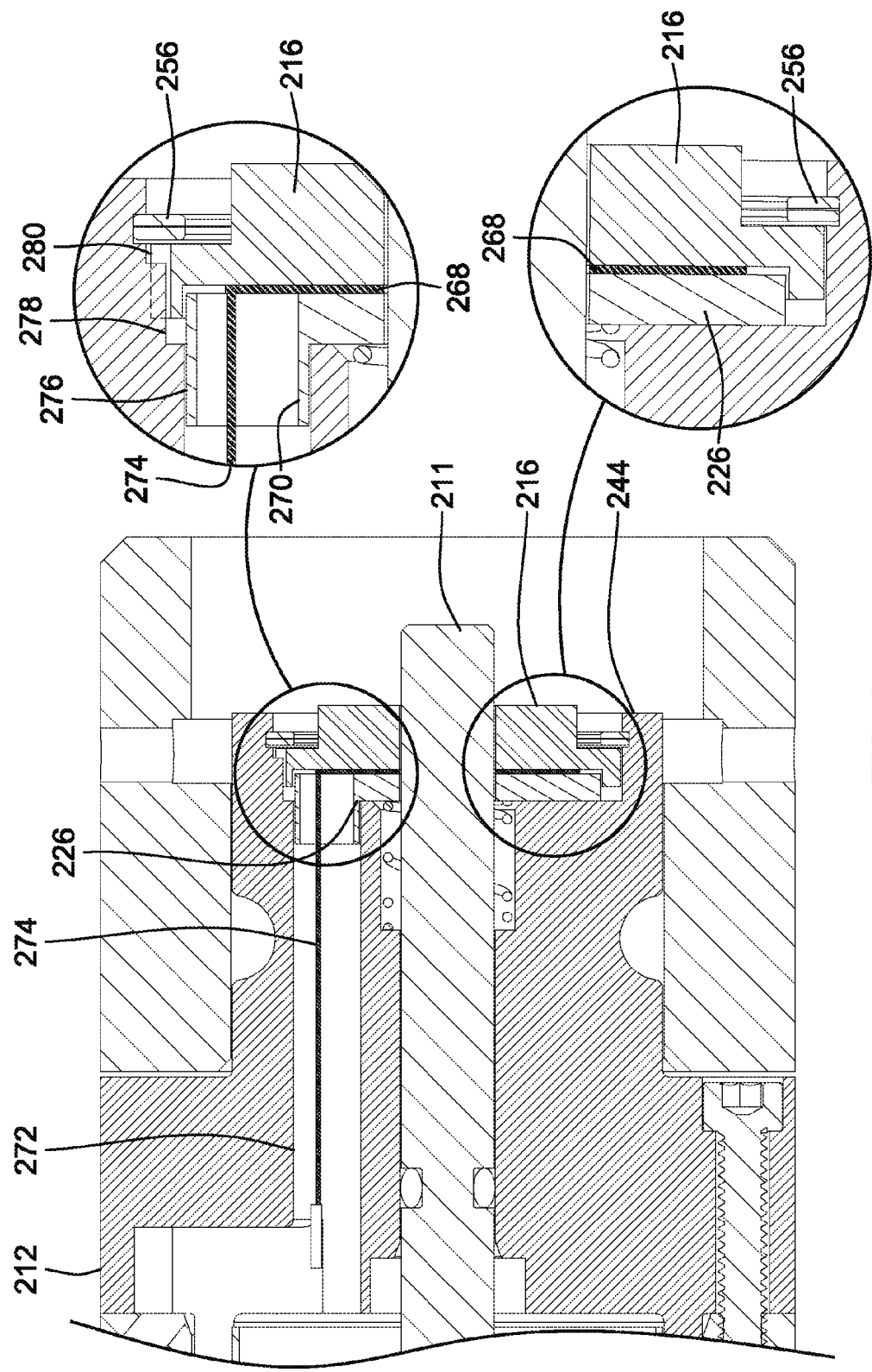
FIG. 17 is a cross section of the mechanical sensor shown in FIG. 11, illustrating another embodiment of an anti-rotational arrangement of the mechanical sensor.

Turning now to FIG. 17, another embodiment of an anti-rotational arrangement is illustrated therein. In this embodiment, both actuation disk 216 and locating disk 226 are independently rotationally fixed relative to nose piece 212. With regard to actuation disk 216, the same includes a key way 280 for reception of a key 278 formed on nose piece 212 in the same manner as that described above relative to FIGS. 14A-14C. As a result, actuation disk 216 is rotationally fixed relative to nose piece 212.

Location disk 226 includes a boss 276 which projects into termination bore 272 as shown, in the same manner as that described above relative to FIGS. 16A-16C. As a result, location disk 226 is also rotationally fixed relative to nose piece 212. As a corresponding result, actuation disk 216 and location disk 226 are rotationally fixed relative to one another.

Figure 18A:
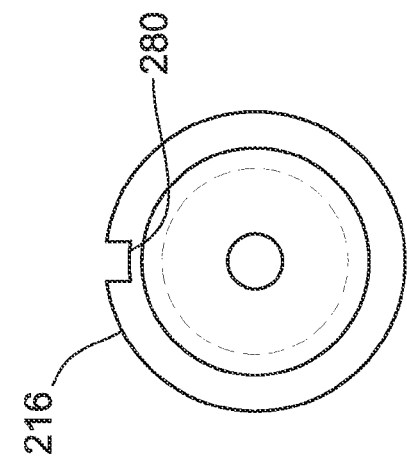
FIGS. 18A-18C illustrate various keys and keyways of the anti-rotational arrangement shown in FIG. 17.
Figure 18B:
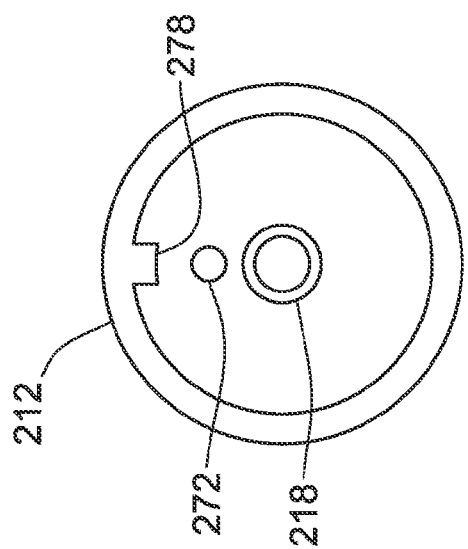
Figure 18C:
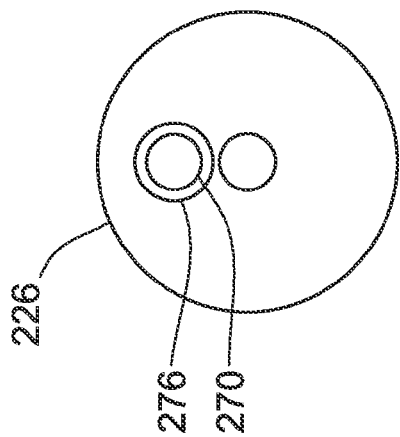

The aforementioned features of FIG. 17 are shown in greater detail in FIGS. 18A-18C. As shown in FIG. 18A, key 278 projects radially inwardly on nose piece 212 as shown. This key 278 is received within key way 280 formed in actuation disk 216 shown in FIG. 18B. With reference to FIG. 18C, boss 276 is illustrated therein.

The Applicants have also found that it is possible to use other means of rotationally fixing the actuation disk 216, and location disk 226. For example, these components could be mechanically fixed to one another by welding, soldering, fastening, etc. Hereafter, a keying arrangement could be provided between one of these disks and nose piece 212. As a result, axial movement of these components would be permitted, but rotational movement would be prevented.

The control unit referenced above, also referred to as a controller 106 may be a microprocessor coupled to the various apparatus of the system. The controller 106 may also be a server coupled to an array of peripherals or a desktop computer, or a laptop computer, or a smart-phone. It is also contemplated that the controller is configured to control each individual latching solenoid and may be remote from any of the apparatus. Communication between the controller 106 and the various apparatus may be either by hardwire or wireless devices. A memory/data base coupled to the controller may be remote from the controller 106. The controller 106 typically includes an input device, for example a mouse, or a keyboard, and a display device, for example a monitor screen or a smart phone. Such devices can be hardwired to the controller or connected wirelessly with appropriate software, firmware, and hardware. The display device may also include a printer coupled to the controller 106. The display device may be configured to mail or fax reports as determined by a user. The controller 106 may be coupled to a network, for example, a local area network or a wide area network, which can be one of a hardwire network and a wireless network, for example a Bluetooth network or internet network, for example, by a WIFI connection or "cloud" connection.

As another advantage of the invention herein, mechanical sensor 214 advantageously allows for a torque setting functionality. More specifically, a user may input into controller 106 for example a set point for an installation torque of actuator 210 may be set at controller 106. Controller 106, by way of connection to sensor 268, may detect the torque sensed by sensor 268 as actuator 210 is installed. Controller 106 may be configured to provide a pass/fail indication based on this set point. That is, controller 106 is operable to indicate that the set point installation torque has either been met or not met to provide a user an indication that the actuator 210 is fully installed. Notably, some installations may require lesser installation torque than others between actuator 210 and its associated valve. The above functionality allows a user to pre-define a desirable installation torque, and thereafter, verify that this installation torque has been met via mechanical sensor 212, and more specifically sensor 268.

Furthermore, rather than utilize controller 106, a stand-alone indicator may also be provided. Mechanical sensor 212, and more specifically sensor 268, may be connected to this indicator and provide the above referenced set point and pass/fail functionality. It should also be recognized that the above set point and pass/fail functionality, whether integrated into controller 106 or provided by a stand-alone indicator may be software based or hardware based. As an example of a software based system, the above functionality may be part of the operational software/firmware embedded in controller 106. As an example of a hardware based system, an arrangement of electrical components (e.g. operational amplifiers, etc.) may be connected in a circuit to achieve the above functionality.

Yet further, actuator 210 may incorporate its own onboard indicator as schematically shown in FIG. 12. Such an on-board indicator may be a visual indicator such as a light or an audible indicator such as a tone generator. This indicator may include internal circuitry so as to establish a set point for an installation torque for each actuator 210. This feature may be preset, or be a user defined setting. In the context of a user-defined arrangement, actuator 210 can have appropriate input devices for setting the set point. Alternatively, actuator 210 can have an I/O port for setting the installation torque set point via an external application.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present mechanism has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the disclosure as described herein may be made, none of which depart from the spirit or scope of the present disclosure. The particular embodiments and applications were chosen and described to provide the best illustration of the principles of the disclosure and its practical application to thereby enable one of ordinary skill in the art to utilize the disclosure in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A mechanical sensor coupled to an actuator, the mechanical sensor being operable to detect when the actuator is fully installed on a valve, the mechanical sensor comprising:
    an actuation disk configured for reciprocal, axial movement within a bore defined in a nose piece of the actuator;
    a location disk configured for reciprocal axial movement within the bore defined in the nose piece of the actuator;
    a sensor axially interposed between the actuation disk and location disk;
    wherein when the actuator is installed on a valve, a portion of the valve contacts the actuation disk and moves the actuation disk back against the sensor to indicate that the actuator is fully installed on the valve; and
    wherein the actuation disk and location disk are rotationally fixed relative to one another about a center longitudinal axis of the mechanical sensor by an anti-rotational arrangement.

2. The mechanical sensor of claim 1, further comprising an adaptor, with the adaptor configured for rotational engagement with the nose piece and the valve.

3. The mechanical sensor of claim 1, wherein the anti-rotational arrangement is formed by a first key and first keyway receiving the first key, and a second key and a second keyway receiving the second key.

4. The mechanical sensor of claim 3, wherein the first key is formed on the nose piece, and the first keyway is formed on the actuation disk, and wherein the second key is formed on the actuation disk and the second keyway is formed on the location disk.

5. The mechanical sensor of claim 1, wherein the anti-rotational arrangement is formed by a key and a keyway receiving the key, and a boss and a termination bore receiving the boss.

6. The mechanical sensor of claim 5, wherein the key is formed on the actuation disk and the keyway is formed on the location disk, and wherein the boss is formed on the location disk and the termination bore is formed on the nose piece.

7. The mechanical sensor of claim 5, wherein the key is formed on the nose piece and the keyway is formed on the actuation disk, and wherein the boss is formed on the location disk and the termination bore is formed on the nose piece.

8. The mechanical sensor of claim 1, wherein the sensor is a pressure sensitive film device configured to detect a pressure between the actuation disk and location disk.

9. A mechanical sensor coupled to an actuator, the mechanical sensor being operable to detect when the actuator is fully installed on a valve, the mechanical sensor comprising:
    an actuation disk configured for reciprocal, axial movement within a bore defined in a nose piece of the actuator;

a location disk configured for reciprocal, axial movement within the bore defined in the nose piece of the actuator;

a sensor axially interposed between the actuation disk and location disk;

wherein when the actuator is installed on a valve, a portion of the valve contacts the actuation disk and moves the actuation disk back against the sensor to indicate that the actuator is installed on the valve; and wherein the nose piece includes a termination bore, and the location disk includes an aperture aligned coaxially with the termination bore, and wherein the sensor includes lead wires which pass through the aperture of the location disk and through the termination bore of the nose piece.

10. The mechanical sensor of claim 9, wherein the aperture of the location disk and the termination bore of the nose piece are coaxially aligned along an axis which is parallel to and radially offset from a center longitudinal axis of the mechanical sensor.

11. An actuator for a valve, the actuator comprising:
an actuator housing;
a nose piece coupled to the housing;
a bore defined in the nose piece;
an actuation disk disposed in the bore of the nose piece;
a location disk disposed in the bore of the nose piece, the actuation disk and location disk axially movable within the nose piece;
a bias member disposed in the nose piece, the bias member configured to force the location disk against a sensor which is in turn forced against the actuation disk;
wherein the sensor is a pressure sensitive film device configured to detect a pressure between the actuation disk and location disk.

12. A mechanical sensor coupled to an actuator, the mechanical sensor being operable to detect when the actuator is fully installed on a valve, the mechanical sensor comprising:
an actuation disk within a bore defined in a nose piece of the actuator;
a location disk within the bore defined in the nose piece of the actuator;
a sensor axially interposed between the actuation disk and location disk; and
wherein the actuation disk and location disk are rotationally fixed relative to one another about a center longitudinal axis of the mechanical sensor by an anti-rotational arrangement.

13. The mechanical sensor of claim 12, wherein the anti-rotational arrangement is formed by a first key and first keyway receiving the first key, and a second key and a second keyway receiving the second key.

14. The mechanical sensor of claim 13, wherein the first key is formed on the nose piece, and the first keyway is formed on the actuation disk, and wherein the second key is formed on the actuation disk and the second keyway is formed on the location disk.

15. The mechanical sensor of claim 12, wherein the anti-rotational arrangement is formed by a key and a keyway receiving the key, and a boss and a termination bore receiving the boss.

16. The mechanical sensor of claim 15, wherein the key is formed on the actuation disk and the keyway is formed on the location disk, and wherein the boss is formed on the location disk and the termination bore is formed on the nose piece.

17. The mechanical sensor of claim 15, wherein the key is formed on the nose piece and the keyway is formed on the actuation disk, and wherein the boss is formed on the location disk and the termination bore is formed on the nose piece.

18. The mechanical sensor of claim 12, wherein the sensor is a pressure sensitive film device configured to detect a pressure between the actuation disk and location disk.

19. The mechanical sensor of claim 12, wherein when the actuator is installed on a valve, a portion of the valve contacts the actuation disk and moves the actuation disk back against the sensor to indicate that the actuator is fully installed on the valve.

* * * * *

UNITED STATES PATENT AND TRADEMARK OFFICE
CERTIFICATE OF CORRECTION

PATENT NO. : 9,714,718 B2  
APPLICATION NO. : 14/731595  
DATED : July 25, 2017  
INVENTOR(S) : Jeff Rogala et al.

It is certified that error appears in the above-identified patent and that said Letters Patent is hereby corrected as shown below:

In the Claims

Column 12, Claim 1, Line 19, reads "reciprocal axial" and should read --reciprocal, axial--

Column 13, Claim 9, Line 8, reads "actuator is installed on" and should read --actuator is fully installed on--

Signed and Sealed this  
Nineteenth Day of September, 2017

Joseph Matal  
*Performing the Functions and Duties of the*  
*Under Secretary of Commerce for Intellectual Property and*  
*Director of the United States Patent and Trademark Office*